United States Patent
Bauchot et al.

(10) Patent No.: US 9,158,820 B2
(45) Date of Patent: Oct. 13, 2015

(54) METHOD FOR MANAGING EMAIL

(71) Applicant: International Business Machines Corporation, Armonk, NY (US)

(72) Inventors: Frederic Bauchot, Saint-Jeannet (FR); Yann Gouedo, Nice (FR)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 13/687,453

(22) Filed: Nov. 28, 2012

(65) Prior Publication Data

US 2013/0144886 A1  Jun. 6, 2013

(30) Foreign Application Priority Data

Dec. 1, 2011  (EP) ..................... 11306597

(51) Int. Cl.
  *G06F 17/30*  (2006.01)
  *G06Q 10/10*  (2012.01)

(52) U.S. Cl.
  CPC .......... *G06F 17/3053* (2013.01); *G06Q 10/107* (2013.01)

(58) Field of Classification Search
  CPC .......... G06F 17/30864; G06F 17/3053; G06F 17/3064; G06F 17/30867; G06F 17/30991; G06F 17/2264; G06F 17/30722; G06F 17/30873; G06F 17/3089; G06F 17/30312; G06F 17/2211; G06F 17/30038; G06F 17/30616; G06F 17/30699; G06F 17/30887; G06F 17/30; G06F 17/30011; G06F 17/30424; G06F 17/30899
  USPC ................................. 707/748, 752
  See application file for complete search history.

(56) References Cited

U.S. PATENT DOCUMENTS

| | | | |
|---|---|---|---|
| 7,243,109 B2 * | 7/2007 | Omega et al. | 707/737 |
| 7,289,949 B2 | 10/2007 | Warner et al. | |
| 7,810,033 B2 | 10/2010 | Cordes et al. | |
| 8,214,346 B2 * | 7/2012 | Pradhan et al. | 707/706 |
| 8,396,864 B1 * | 3/2013 | Harinarayan et al. | 707/722 |
| 8,688,788 B2 * | 4/2014 | Wilson | 709/206 |

(Continued)

OTHER PUBLICATIONS

Unpublished European Patent Application No. 11306597.3, filed Dec. 1, 2011, Bauchot, et al., "A Method for Managing Email"; 22 pages.

(Continued)

*Primary Examiner* — Pierre Vital
*Assistant Examiner* — Andalib Lodhi
(74) *Attorney, Agent, or Firm* — Cantor Colburn LLP; Edward Choi

(57) ABSTRACT

This disclosure includes method for managing email that includes providing a list of topics, a reference associated with the topics, and a defined importance value for each reference. The method also includes preparing a topic relevance algorithm for each topic, each topic having associated attributes, and each topic relevance algorithm formed by estimating a relationship value between a topic and its associated attributes based on defined relevance of reference. The method further includes preparing an importance algorithm having a weighted importance attributes formed by estimating a weight for each of the importance attributes based on defined importance of the reference, assessing a target mail using the topic relevance algorithms to determine a topic relevance and against the importance algorithm to determine an importance and determining that a target mail has a threshold importance for a particular topic relevance.

15 Claims, 14 Drawing Sheets

(56) References Cited

U.S. PATENT DOCUMENTS

| | | | |
|---|---|---|---|
| 8,782,805 B2* | 7/2014 | Zhang et al. | 726/30 |
| 8,826,280 B1* | 9/2014 | Robertson et al. | 718/100 |
| 2005/0267944 A1 | 12/2005 | Little, II | |
| 2008/0120558 A1* | 5/2008 | Nathan et al. | 715/764 |
| 2009/0254498 A1 | 10/2009 | Gupta et al. | |
| 2010/0235367 A1 | 9/2010 | Chitiveli et al. | |
| 2011/0258201 A1* | 10/2011 | Levow et al. | 707/748 |

OTHER PUBLICATIONS

Abbreviated Examination Report, Intellectual Property Office; Application No. GB1221220.5, Mar. 25, 2013, 6 pages.

Apte, et al., "Automated Learning of Decision Rules for Text Categorization", ACM Transactions on Information Systems (TOIS), Doi: 10.1145/183422.183423; 1994, vol. 12(3): pp. 233-251.

German Office Action dated Mar. 13, 2014; 5 pgs.

Neustaedter, et al., "Beyond "From" and "Received": Exploring the Dynamics of Email Triage", In: CHI'05 extended abstracts of Human factors in computing systems; Doi: 10.1145/1056808.1057071; ACM 2005, S.; pp. 1977-1980.

Sebastiani, F., "Machine Learning in Automated Text Categorization", ACM computing surveys (CSUR), Doi: 10.1145/505282.505283; 2002, vol. 34(1); pp. 1-47.

Wang et al., "Enterprise Email Classification Based on Social Network Features", In: Advances in Social Networks Analysis and Mining (ASONAM), Doi: 10.1109/ASONAM.2011.89; 2011 International Conference on IEEE, 2001, pp. 532-536.

\* cited by examiner

METHOD FOR MANAGING EMAIL

CROSS REFERENCE TO RELATED APPLICATIONS

This application claims priority to EP Patent Application No. 11306597.3 filed Dec. 1, 2011, the entire contents of which are hereby incorporated by reference.

BACKGROUND

The invention relates to the field of electronic mail (email) systems, and in particular, to managing email.

Typically, when users of an email system are going to be out of the office or otherwise unable to read incoming email messages, the users configure the email system to operate in an out of office mode. The out of office mode notifies senders that the recipient is not receiving email messages at that time and stores the email messages for the user to review upon his return. When the user returns, a huge number of emails may need to be reviewed, without easily assessing the ones to be treated with the highest priority. Some emails may have been sent with an importance field set as high. However, since the importance field is set by the sender and not the receiver, what is important for the sender may not be important for the receiver. Furthermore, when many emails are specified as being important a user will still need to assess which ones deserve to be treated first.

BRIEF SUMMARY

In one embodiment, a method for managing email includes providing a list of topics, a reference associated with the topics, and a defined importance value for each reference. The method also includes preparing a topic relevance algorithm for each topic, each topic having associated attributes, and each topic relevance algorithm formed by estimating a relationship value between a topic and its associated attributes based on defined relevance of reference. The method further includes preparing an importance algorithm having a weighted importance attributes formed by estimating a weight for each of the importance attributes based on defined importance of the reference, assessing a target mail using the topic relevance algorithms to determine a topic relevance and against the importance algorithm to determine an importance and determining that a target mail has a threshold importance for a particular topic relevance.

In another embodiment, a system for managing email includes a plurality of topics, a reference associated with each of the plurality of topics, and a defined importance value for each reference. The system includes a relevance manager for preparing a topic relevance algorithm for each of the plurality of topics, each topic having associated attributes, and each topic relevance algorithm formed by estimating a relationship value between a topic and its associated attributes based on defined relevance of reference. The system also includes an importance manager for preparing an importance algorithm including weighted importance attributes formed by estimating a weight for each of the importance attributes based on defined importance of the reference. The system also includes an assessment manager for assessing a target mail using the topic relevance algorithms to determine a topic relevance and against the importance algorithm to determine an importance and for determining that a target mail has a threshold importance for a particular topic relevance.

In yet another embodiment, a computer program product including computer readable recording medium having computer readable code stored thereon for managing mail, said computer readable code which when loaded onto a computer system and executed performs a method. The method includes providing a list of topics, a reference associated with the topics, and a defined importance value for each reference. The method also includes preparing a topic relevance algorithm for each topic, each topic having associated attributes, and each topic relevance algorithm formed by estimating a relationship value between a topic and its associated attributes based on defined relevance of reference. The method further includes preparing an importance algorithm having a weighted importance attributes formed by estimating a weight for each of the importance attributes based on defined importance of the reference, assessing a target mail using the topic relevance algorithms to determine a topic relevance and against the importance algorithm to determine an importance and determining that a target mail has a threshold importance for a particular topic relevance.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

Embodiments of the invention will now be described, by means of example only, with reference to the accompanying drawings in which.

DETAILED DESCRIPTION

Figure 1:
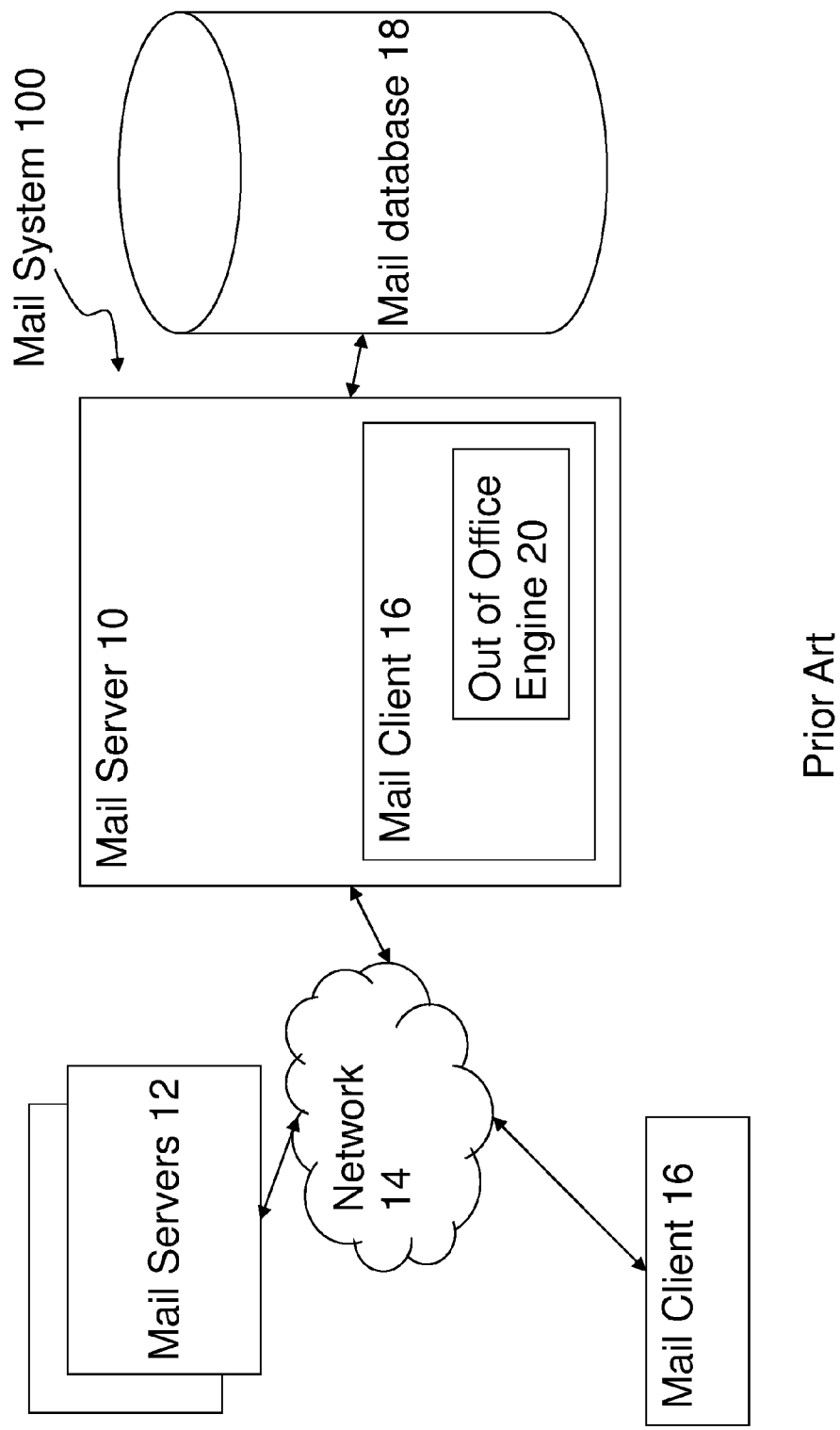
FIG. 1 is a component diagram of an out of office engine of the prior art.

Referring to FIG. 1, a prior art out of office engine 20 in a mail system 100 is described. Mail system 100 includes a mail server 10, mail servers 12, network 14, mail client 16 and mail database 18. Typically, email is sent between mail server 10 and mail servers 12 through network 14. Mail server 10 stores email on mail database 18. Mail server 10 comprises server mail client 16 that accepts direct user log so that the user may directly send and receive emails. Network 14 is a computer network based on standard protocols such as Transmission Control Protocol/Internet Protocol (TCP/IP) but could also use other network protocols.

Figure 2:
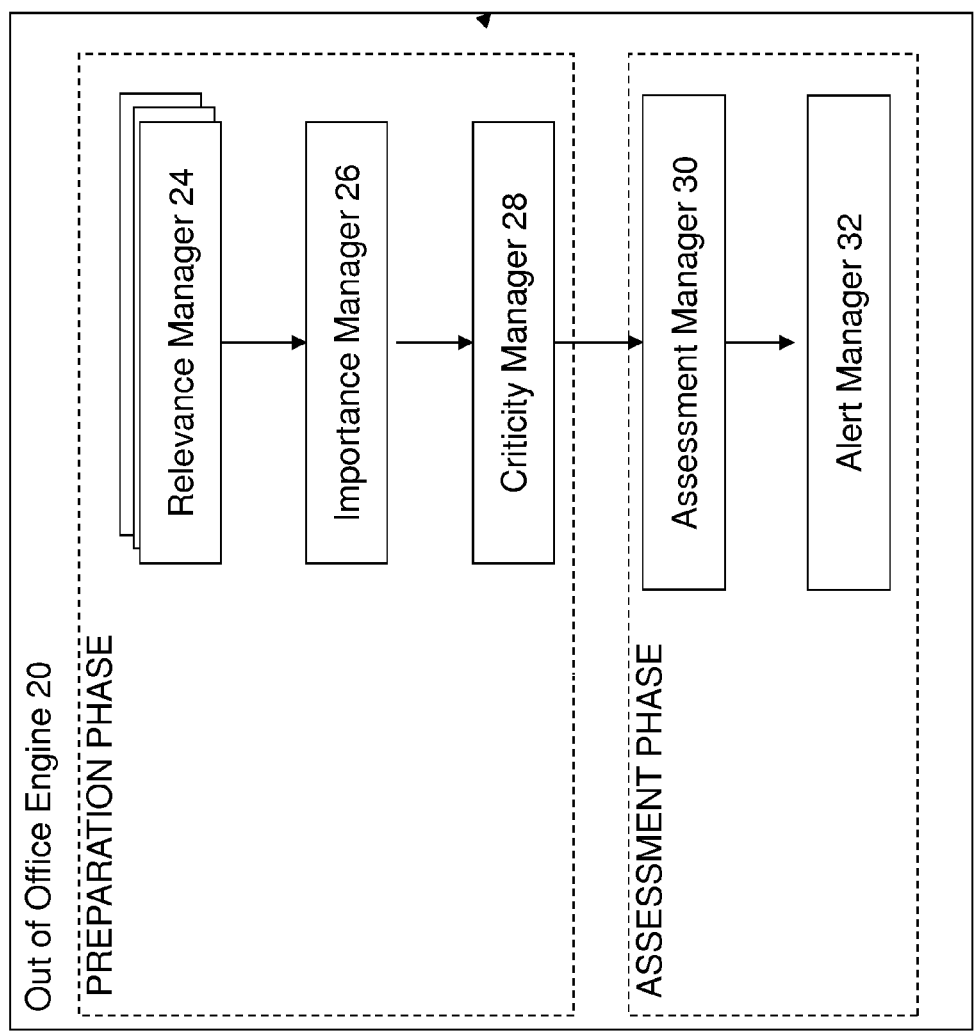
FIG. 2 is a component diagram of an out of office engine in accordance with a embodiment of the present invention.

Server mail client 16 includes an out of office engine 20 that handles administration of mail when the mail box is set to an out of office state. A distributed mail client 16 synchronizes mail with server mail client 16 and allows a remote user to control the out of office features in the mail server. In other embodiment the out of office engine could be located in the local mail client. Out of office engine 20 of FIG. 2 is the embodiment of the invention and would replace out of office engine 20 in the FIG. 1 deployment diagram. Mail database 18 may be a standard database such as IBM DB2. IBM and DB2 are registered trademarks of International Business Machines Corporation.

Referring now to FIG. 2, a block diagram of an out of office engine 20 in accordance with an embodiment is shown. In exemplary embodiments, the out of office engine 20 includes a relevance manager 24, an importance manager 26, a criticity manager 28, an assessment manager 30 and alert manager 32.

In exemplary embodiments, the relevance manager 24 evaluates reference topics and email to construct a relevance model for assessing mail received in an out of office period. Details of the relevance manager 24 are described below with reference to FIG. 4.

In exemplary embodiments, the importance manager 26 evaluates a reference, such as an email, and constructs an importance model for assessing email received in the out of office period. Details of the importance manager 26 are described below with reference to FIG. 5.

In exemplary embodiments, the criticity manager 28 constructs a criticity model, a function of the relevance and the importance of each mail, for assessing mail. Details of criticity manager 28 are described below with reference to FIGS. 6 to 9. Together, the relevance manager, importance manager and the criticity manager perform the preparation phase of the out-of-office method.

In exemplary embodiments, the assessment manager 30 assesses if the criticity of a mail meets conditions for an alert. Details of the assessment manager 30 are described below with reference to FIG. 10. The alert manager 32 carries out an action for the alert if the conditions are meet. Together, the assessment manager 30 and the alert manager 32 perform an assessment phase of the out of office method.

Figure 3:
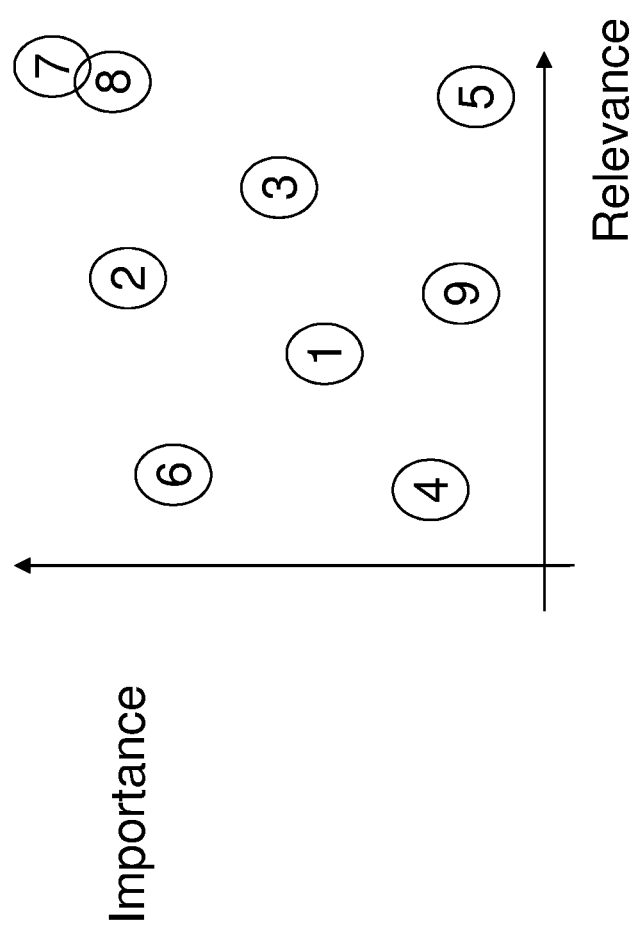
FIG. 3 is a scatter graph representation showing importance against relevance of example mail items in accordance with a embodiment of the present invention.

Referring now to FIG. 3, a graphical representation showing relative importance and relevance of example mail items is shown. Nine nodes numbered 1 to 9 indicate a position of example mail on a graph of importance and relevance. The example mails are shown distributed throughout the space where mail 7 and mail 8 have the highest importance and relevance and mail 4 has the lowest importance and relevance.

Figure 4:
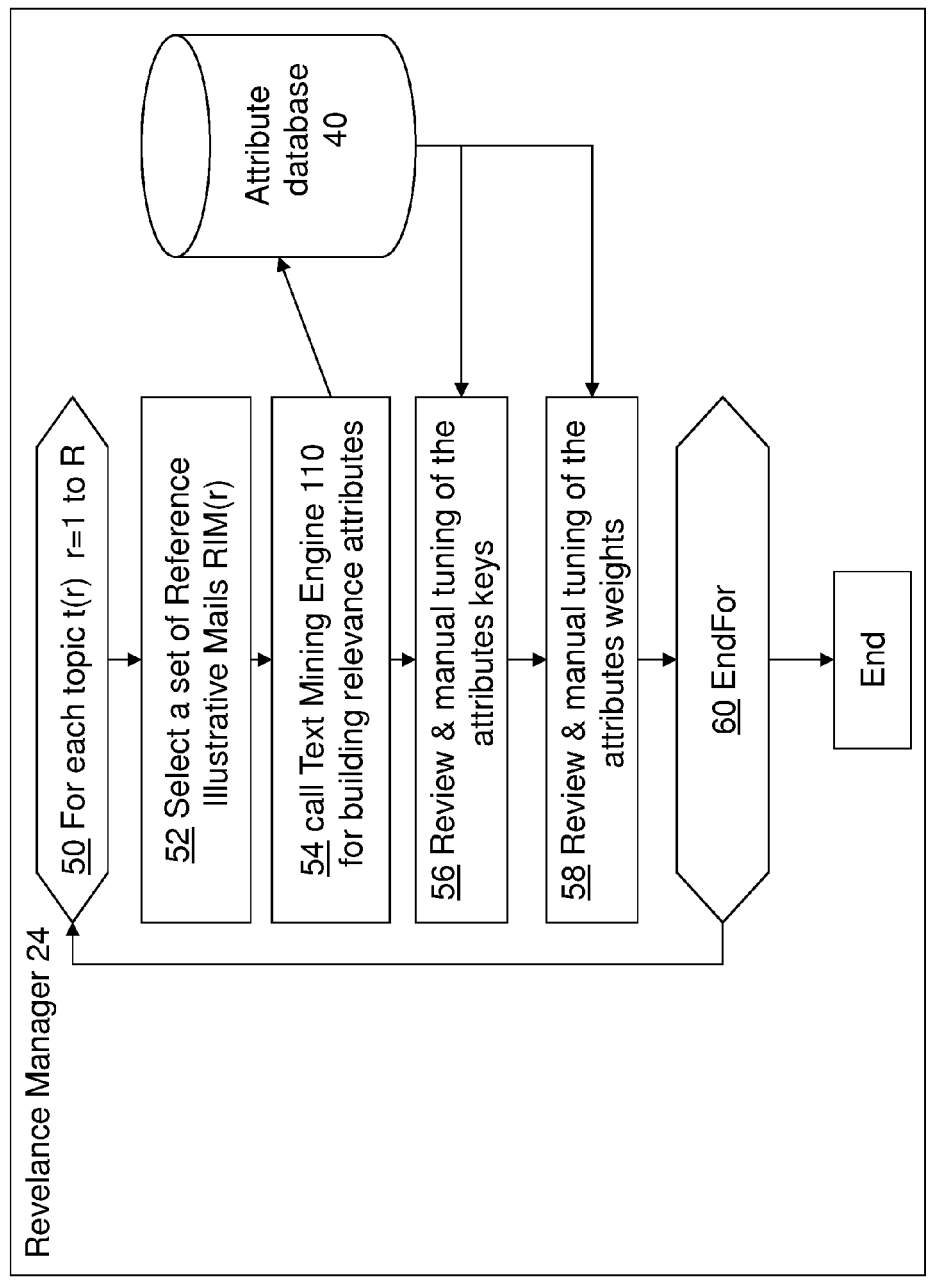
FIG. 4 is a process logic diagram of a relevance manager in accordance with a embodiment of the present invention.

Referring now to FIG. 4, a process logic diagram of a relevance manager in accordance with an embodiment is shown. The relevance manager 24 includes process logic blocks 50, 52, 54, 56, 58 and 60. The relevance manager is configured to populate attribute database 40 with attribute data relating to the temporal (T); spatial (S); personal (P) and general informational (I) attributes of the predefined topics. For the purposes of the example, the total number of topics considered by the relevance manager is R and each topic is identified by a unique index t(r) where r is 1 to R.

Block 50 defines the start of the main process loop and block 60 defines the end. The process followed by the relevance manager is the same for each topic. Therefore a process loop (for example 'for r=1 to R . . . Endfor' type loop) manages blocks 52-58 for each topic t(r).

A collection of attributes types are defined for each topic t(r) comprising: temporal attributes T(r); spatial attributes S(r); personal attributes P(r) and informational attributes I(r). Temporal attributes decorate a topic with events and dates relevant to that topic. Spatial attributes decorate a topic with places and locations relevant to the topic. Personal attributes decorate a topic with people relevant to a topic. Informational attributes decorate a topic with the key facts relevant to the topic including key words. Therefore a topic will equal the set of one or more attributes, for example t(r)=T(r)+S(r)+P(r)+I(r) where T(r), S(r), P(r) and I(r) represent attributes of a particular type.

In block 52, the relevance manager selects a set of reference email RIM(r) assigned for a particular topic t(r). Next, as shown in block 54, the relevance manager uses a data mining engine to parse the reference emails against the topic into a list of attributes T(r)+S(r)+P(r)+I(r) according to a frequency of words found in the reference emails. In exemplary embodiments, each attribute is structured as a two field object comprising a character string key representing the attribute and an associated weight derived from the relative frequency of the character string key occurrence found in the reference emails.

In exemplary embodiments, the temporal attributes are identified through known time date formats and the associated text is eliminated from the search. Personal attributes are identified from email formats or from characters strings matching names in a reference directory and the associated text eliminated from the search. Spatial attributes are identified from a location directory and the associated text eliminated from the search. Information attributes are identified from the most frequent remaining text in the emails.

In block 56, the relevance manager makes a user interface available for a manual review and correction of the attributes found in the key word analysis of block 54. Attributes may be edited, deleted or added to the list of attributes for each topic. Next, as shown in block 58, the relevance manager provides a user interface for the review and correction of weighting accorded to each attribute. Block 60 directs processing to the start 50 of the main process unless all topics have been processed in which case the process ends.

Figure 5:
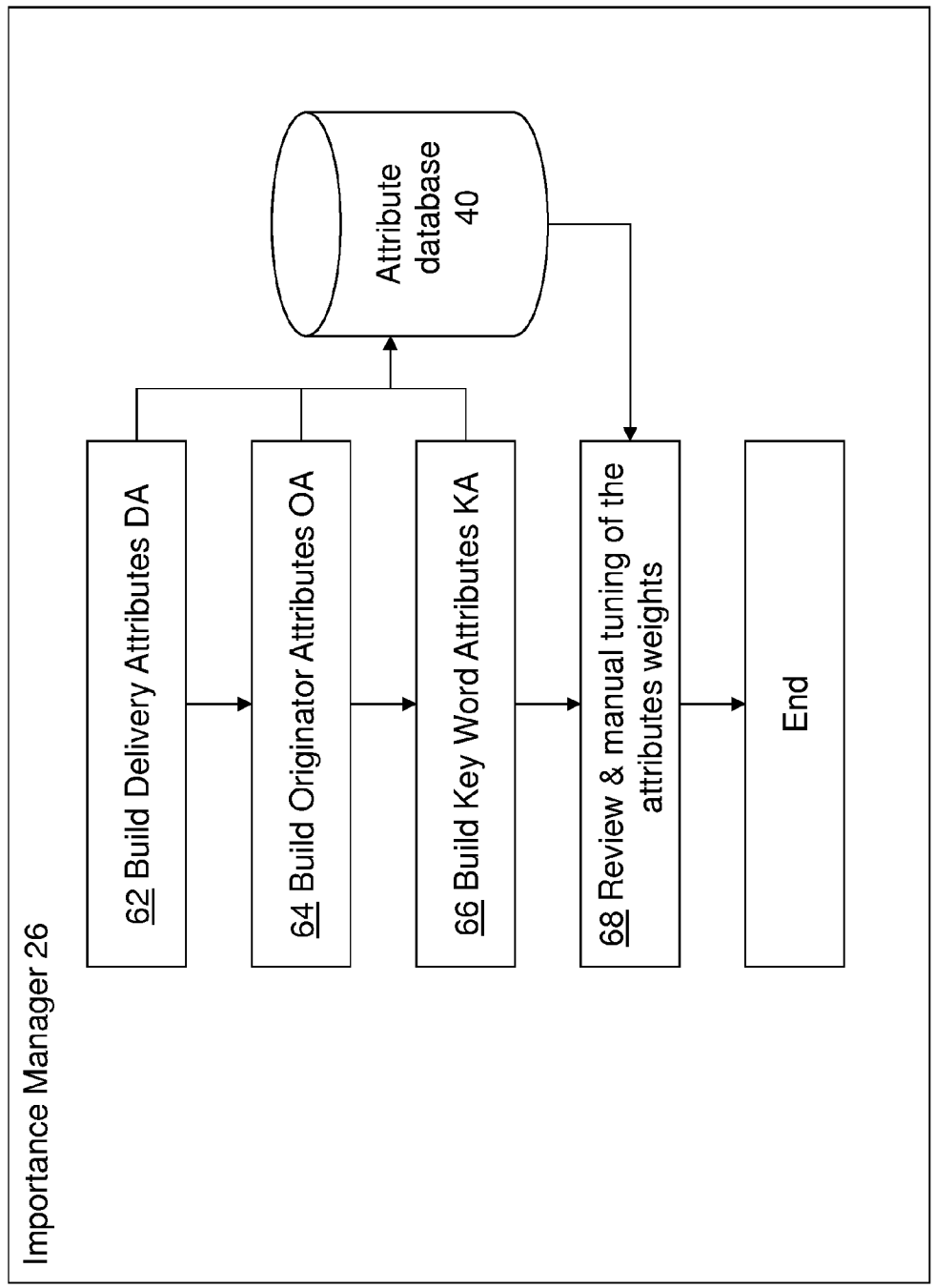
FIG. 5 is a process logic diagram of an importance manager in accordance with a embodiment of the present invention.

Referring now to FIG. 5, a process logic diagram of importance manager 26 in accordance with an embodiment is shown. The importance manager 26 includes process logic blocks 62, 64, 66, and 68. The importance manager 26 is configured to define an importance criterion comprising importance attributes that reveal the importance of a mail in a collection of mail. Importance attributes include, but are not limited to, delivery (D) attributes, originator (O) attributes and key word (K) attributes. In exemplary embodiments, delivery (D) attributes correspond to fields generally defined in emails as importance and delivery priority. In other embodiments an expiry date field or a reply by date field can be used to determine urgency and more reliably when used in conjunction with an out of office period. In exemplary embodiments, originator (O) attributes as specified in the mail are used to identify the hierarchical importance of an originator in a management hierarchy. The importance manager may assume that mail issued by an executive at the top of a management hierarchy is deemed more important than a mail issued by an employee at the bottom of the management hierarchy. Key word (K) attributes are words in the subject and/or body of mail that identify the importance of a mail. The occurrence of keywords and phrases such as "important", "not important", "unimportant", "essential", "not essential", "urgent", "not urgent", "critical", "not critical" and so on, are used to identify the importance of a mail.

As shown in block 62, the importance attribute is defined first with the delivery attributes identified in mail meta-data. Next, as shown in block 64, the importance attribute definition is appended with originator attributes identified from one or more identified hierarchal management responsibility lists. In block 66, the importance attribution is further refined with keyword attributes from the keyword list.

In the exemplary embodiments, the delivery attributes, originator attributes and keyword attributes are given equal priority because such an approximation works and is processor efficient. However, in other embodiments one or more of the delivery, originator and keywords are used and have different weightings along the line of the relevance manager for different advantages. In both the average weighting and different weightings, block 68 is for making a user interface available for a manual review and correction of the attributes weights after which the process ends.

Figure 6:
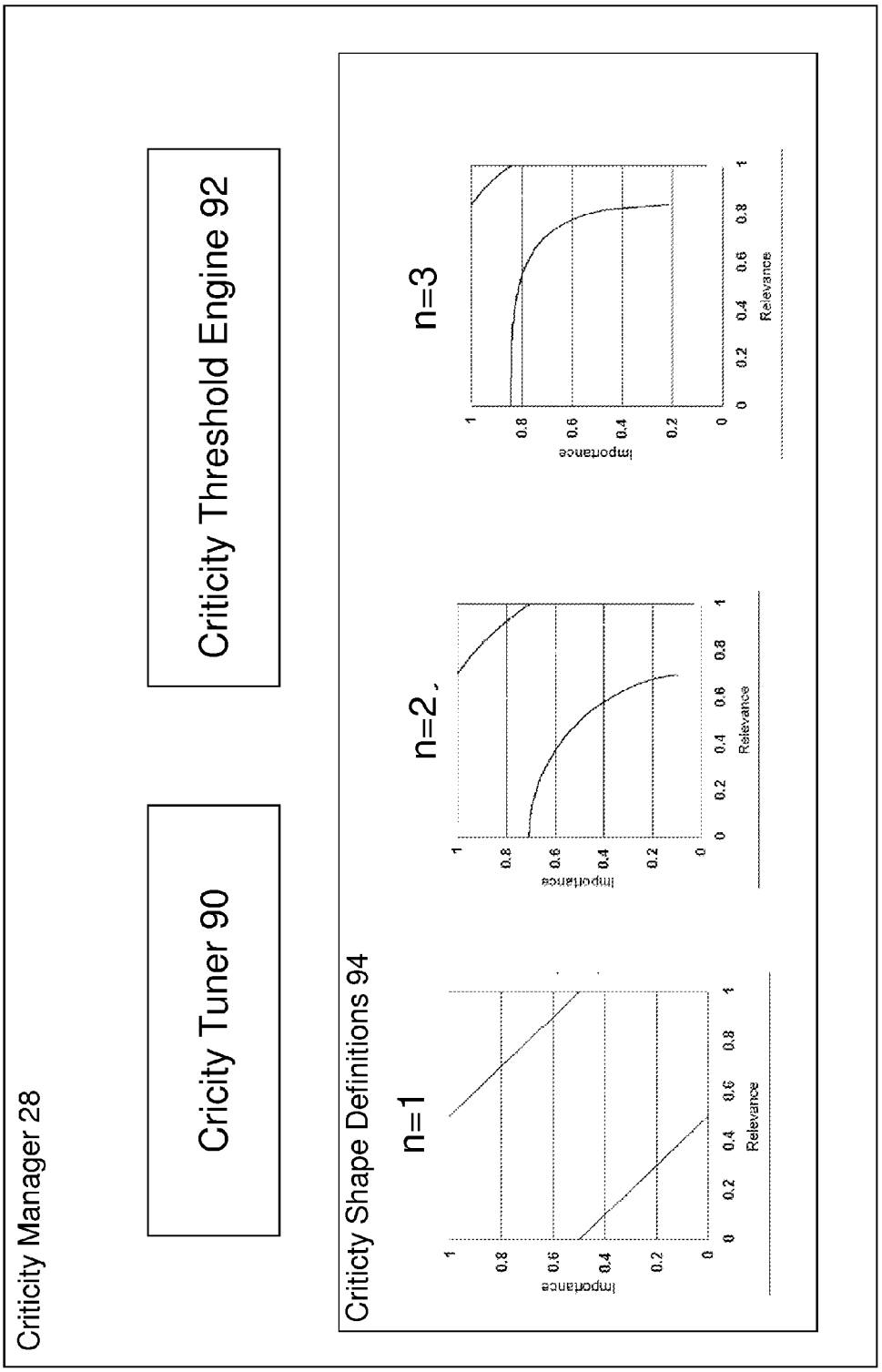
FIG. 6 is a process logic diagram of a criticity manager in accordance with a embodiment of the present invention.

Referring now to FIG. 6 a block diagram of criticity manager 28 in accordance with an exemplary embodiment is shown. The criticity is function of importance and relevance. The criticity manager 28 is configured to evaluate a email's criticity for a given type of alert. The criticity manager 28 includes a criticity tuner 90, a criticity threshold engine 92 and criticity shape definitions 94. In the exemplary embodiments, the criticity is the sum of the Importance (a value between 0 and 1) to the power of n and the Relevance (a value between 0 and 1) to the power of n.

$$\text{Criticity} = \text{Relevance}^n + \text{Importance}^n$$

In exemplary embodiments, the variable n is used to control the set of mails of equal criticity. The importance and relevance of new mail is assessed by the assessment manager resulting in a criticity value between 0 and 2. Criticity tuner 90 chooses a criticity shape definition that best fits the importance and relevance data of the reference email. In exemplary embodiments, the criticity threshold engine 92 defines one or more criticity thresholds based on the chosen criticity shape definition. On a criticity scale, one or more criticity thresholds is defined each being associated with different form of alert. For example: Criticity=1 sends an SMS containing the beginning of the mail; Criticity=1.5 calls the user with an automated service; Criticity=1.7 contacts the user with a human operator; and Criticity 1.9 dispatches a courier to the user. Criticity shape definitions 94 comprise several different models of criticity that can employ. In exemplary embodiments, the higher the level of n the more relevant a mail must be to trigger an alert on an important mail.

Figure 7:
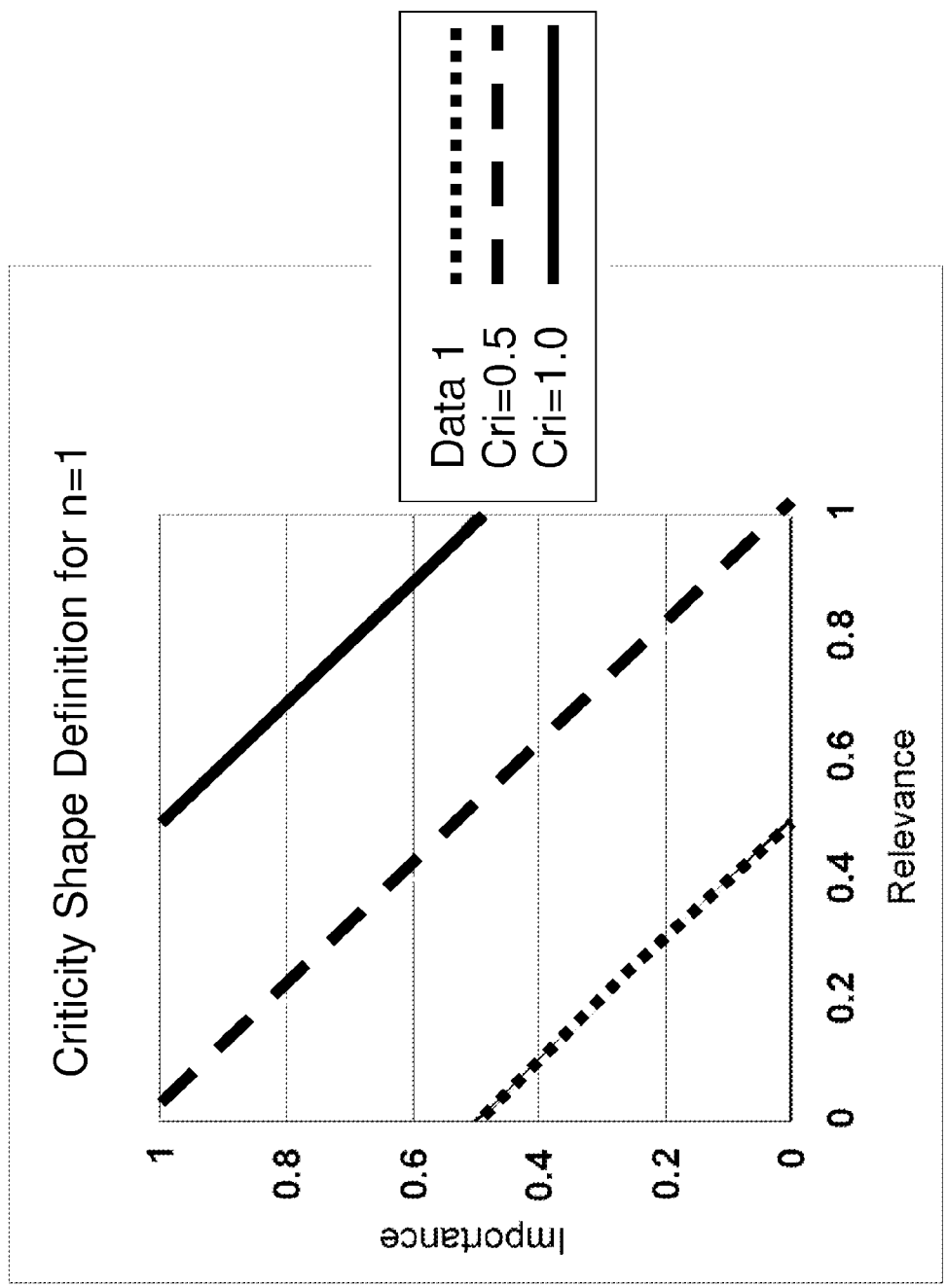
FIG. 7 is a first example graph of a criticity shape definition in accordance with a embodiment of the present invention.

Referring now to FIG. 7, a graph of a criticity shape definition for a first criticity shape (n=1) is shown. The dashed line represents mail having a criticity threshold of 0.5 and the solid line represents mail having a criticity of 1. The dotted line (data 1) represents a reference set of email that matches the first criticity shape.

Figure 8:
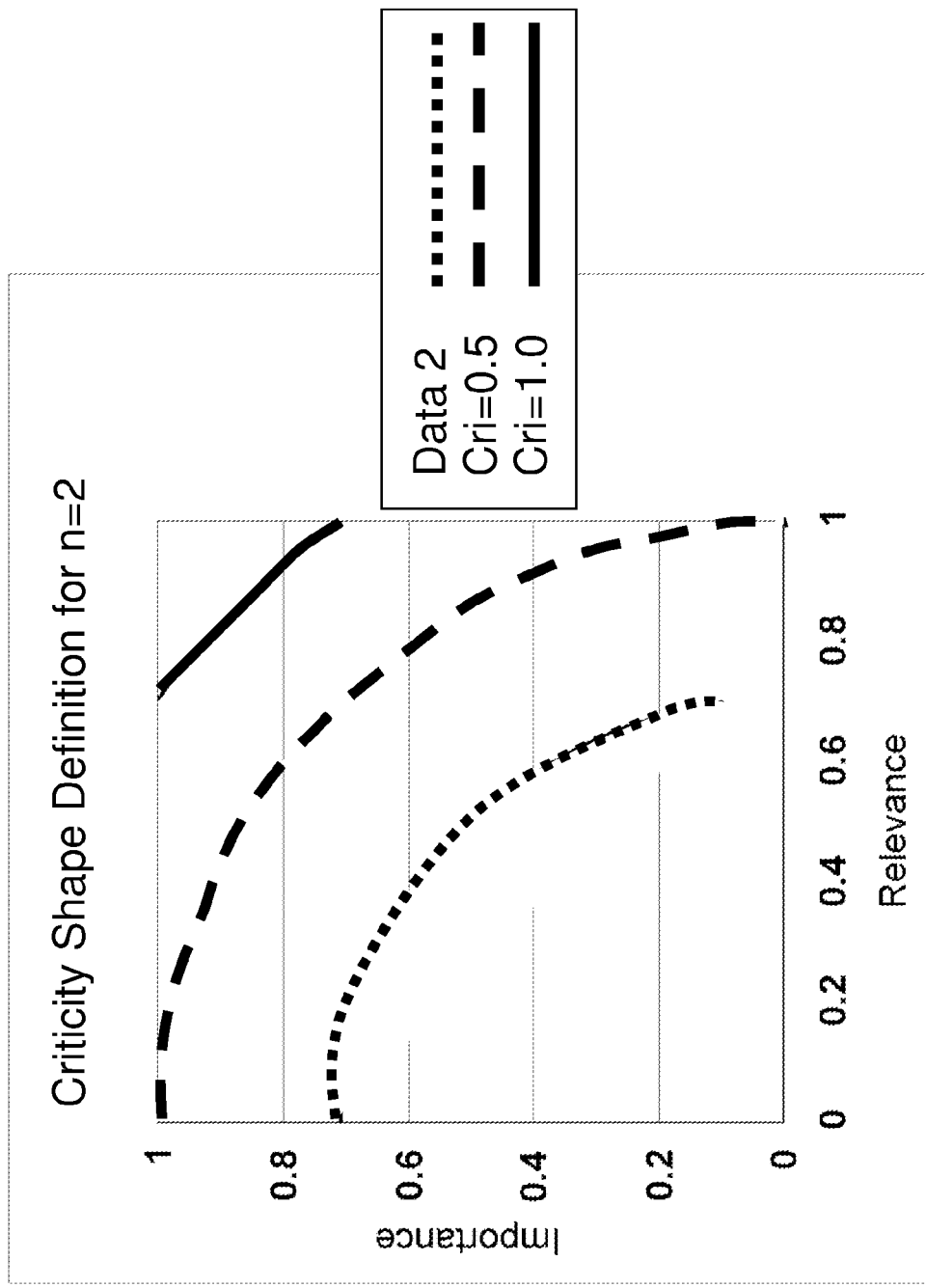
FIG. 8 is a second example graph of a criticity shape definition in accordance with a embodiment of the present invention.

Referring now to FIG. 8, a graph of a criticity shape definition for a second criticity shape (n=2) is shown. The dashed line represents mail having a criticity threshold of 0.5 and the solid line represents mail having a criticity of 1. The dotted line (data 2) represents a reference set of email that matches the second criticity shape.

Figure 9:
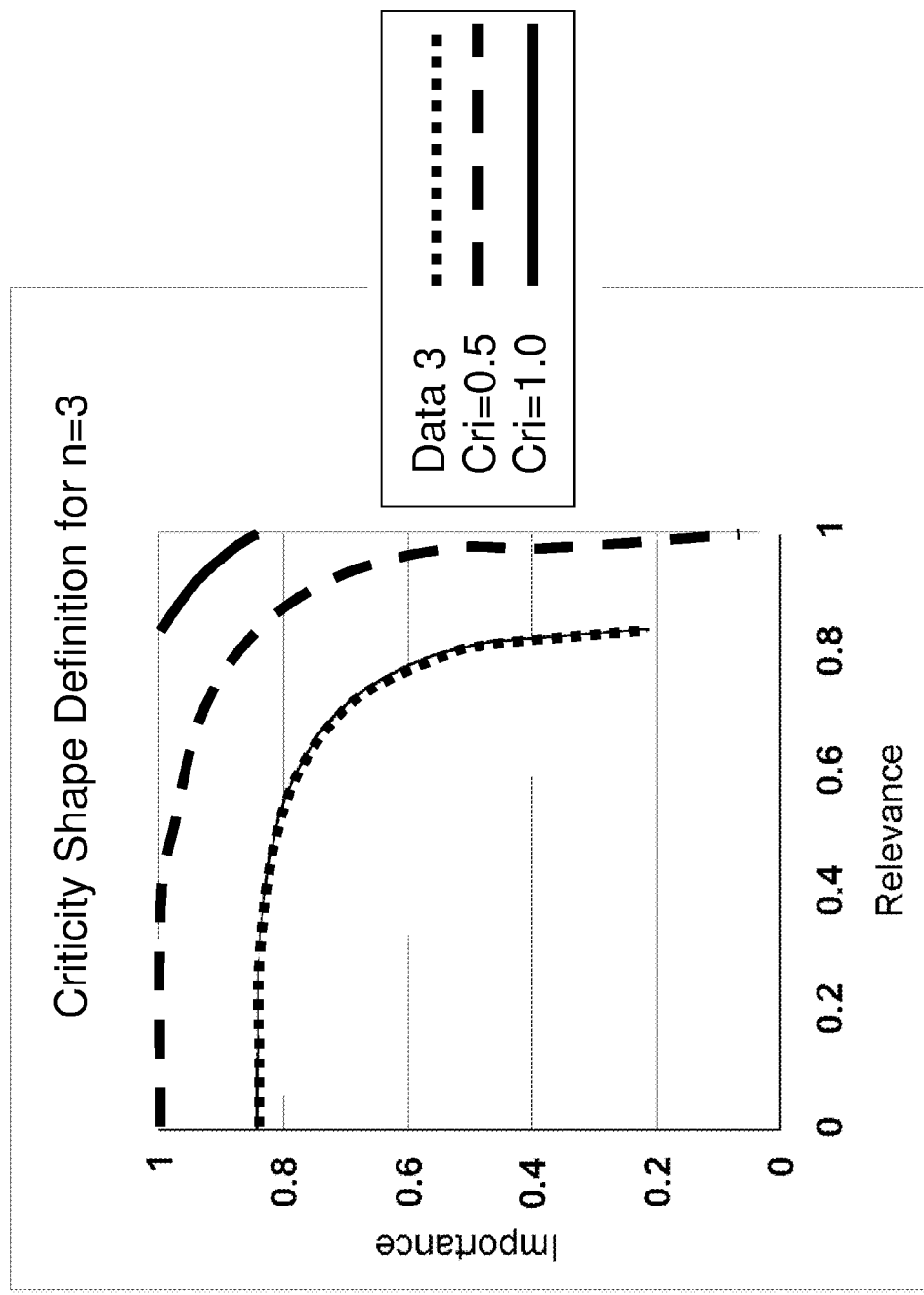
FIG. 9 is a third example graph of a criticity shape definition in accordance with a embodiment of the present invention.

Referring now to FIG. 9, a graph of a criticity shape definition for a third criticity shape (n=3). The dashed line represents mail having a criticity threshold of 0.5 and the solid line represents mail having a criticity of 1. The dotted line (data 3) represents a reference set of email that matches the third criticity shape.

Figure 10:
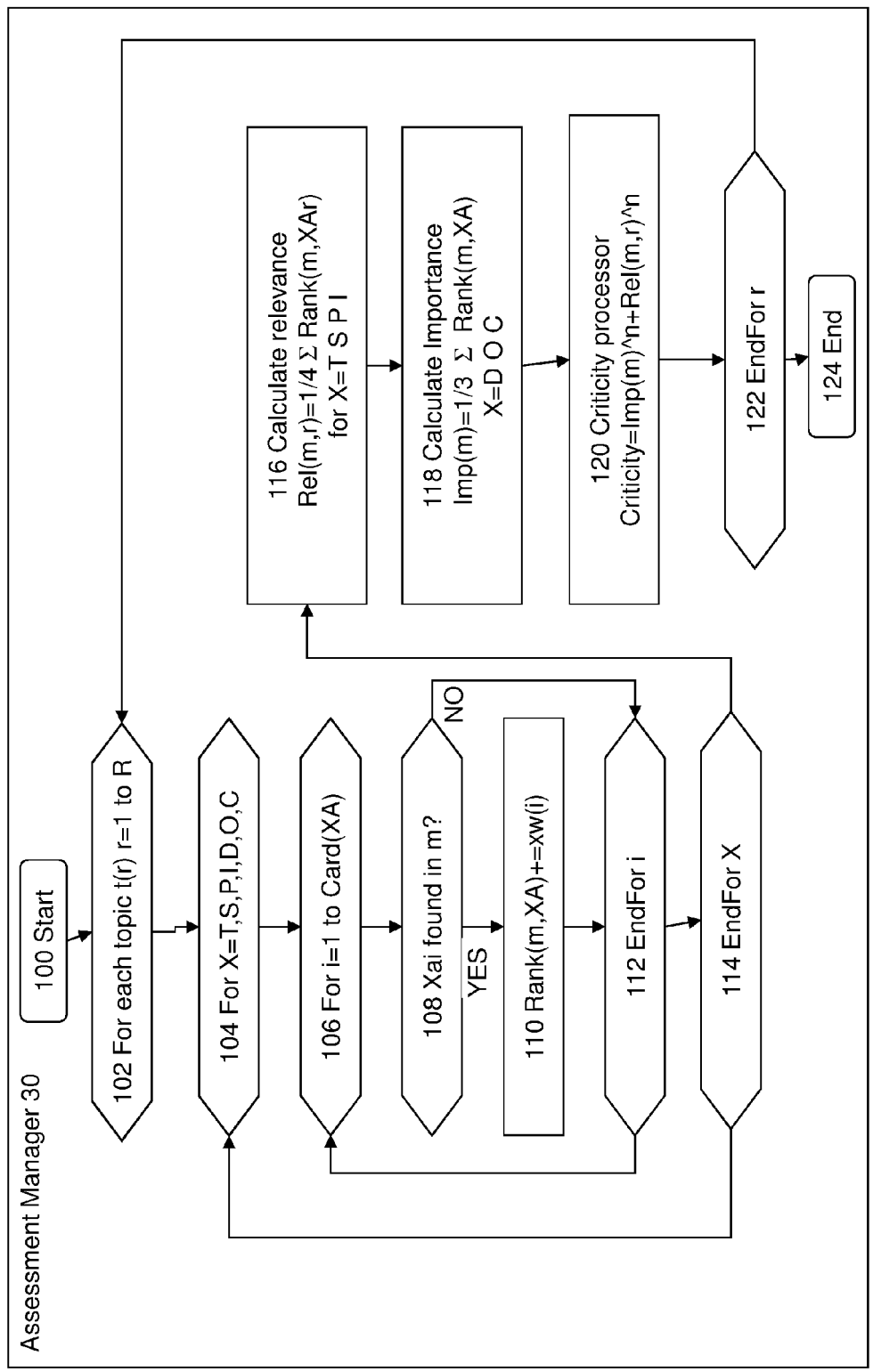
FIG. 10 is a process logic diagram of an assessment manager in accordance with a embodiment of the present invention.

Referring now to FIG. 10, a flow diagram illustrating the operation of an assessment manager in accordance with an embodiment is shown. The assessment manager is configured to calculate the criticity of a mail. The assessment manager 30 comprises process logic blocks 100 to 124. Blocks 100 to 124 are shown for a single email to reduce the complexity of the diagram but in the exemplary embodiments all email is considered. Block 100 is the start of the assessment. At block 102 the assessment manager defines the start of the first loop for considering each topic against each mail. In this loop, loop counter r starts at 1 and ends on the last topic R. Next, as shown at block 104, the assessment manager defines the start of a second loop for considering each attribute type (X) in turn: Temporal (T), Spatial (S), Personal (P), Informational (I), Delivery (D), Originator (O) and Key Word (K) attributes. In this loop X is the loop counter and represents an attribute type.

At block 106 the assessment manager defines the start of a third loop for considering each attribute in an attribute set, i represents a loop counter. For each received mail, a positioning is performed against each attribute set (XA) where XA is one of $T(r); S(r); P(r); I(r); D; O;$ and $K$. $Card(XA)$ represents the number of attributes in that set and the loop counter i starts from 1 and ends on the last attribute in the attribute set. $XA_i$ represents a single attribute in the attribute set. Next, as shown at block 108, the assessment manager considers if a particular attribute $X_{ai}$ is found in the mail m under consideration. If so, then the next block is 110 else the next block is 112.

At block 110 the assessment manager computes a value $Rank(m,XA)$ for each attribute type by adding together each weighted value $xw(i)$ for that attribute. Initially, for all mail and attribute types, $Rank(m,XA)$ is zero; at the end of the assessment $Rank(m,XA)$ is the sum of all the attribute weights found in m. At block 112 the assessment manager loops back to block 106 if there are more attributes for that attribute type. Else the process moves on to block 114. At block 114 the assessment manager loops back to block 104 if there are more attribute types to consider, else the process moves to block 116.

At block 116 the assessment manager calculates a relevance $Rel(m,r)$ value for a mail (m) and a particular topic $t(r)$ by adding the value $Rank(m,XAr)$ for all relevance attributes T, S, P and I, and dividing by 4. By construction relevance takes a value between 0 and 1. The calculation is represented in the diagram as an algorithm $Rek_{m,r} = \frac{1}{4}\Sigma Rank(m,XAr)$ for X=T, S, P, I. Next block 118. Next, as shown at block 118, the assessment manager calculates an importance value $Imp(m)$ for a mail (m) by summing the value $Rank(m,XA)$ for all importance attributes D, O and K and dividing by 3. By construction it takes a value between 0 and 1. The calculation is represented in the diagram by the algorithm $Imp(m) = \frac{1}{3}\Sigma Rank(m,XA)$ for X=D, O, K. Next block 120.

At block 120 the assessment manager calculates a criticity for each mail by summing the importance value to the chosen power (the chosen criticity shape definition) and relevance value to the chosen power. Next, as shown at block 122, the assessment manager loops back to block 102 if there are more topics to consider. Else the process moves on to block 124. At block 124 the assessment manager ends the assessment for that particular mail. The process starts again at block 100 for the next mail.

Figure 11:
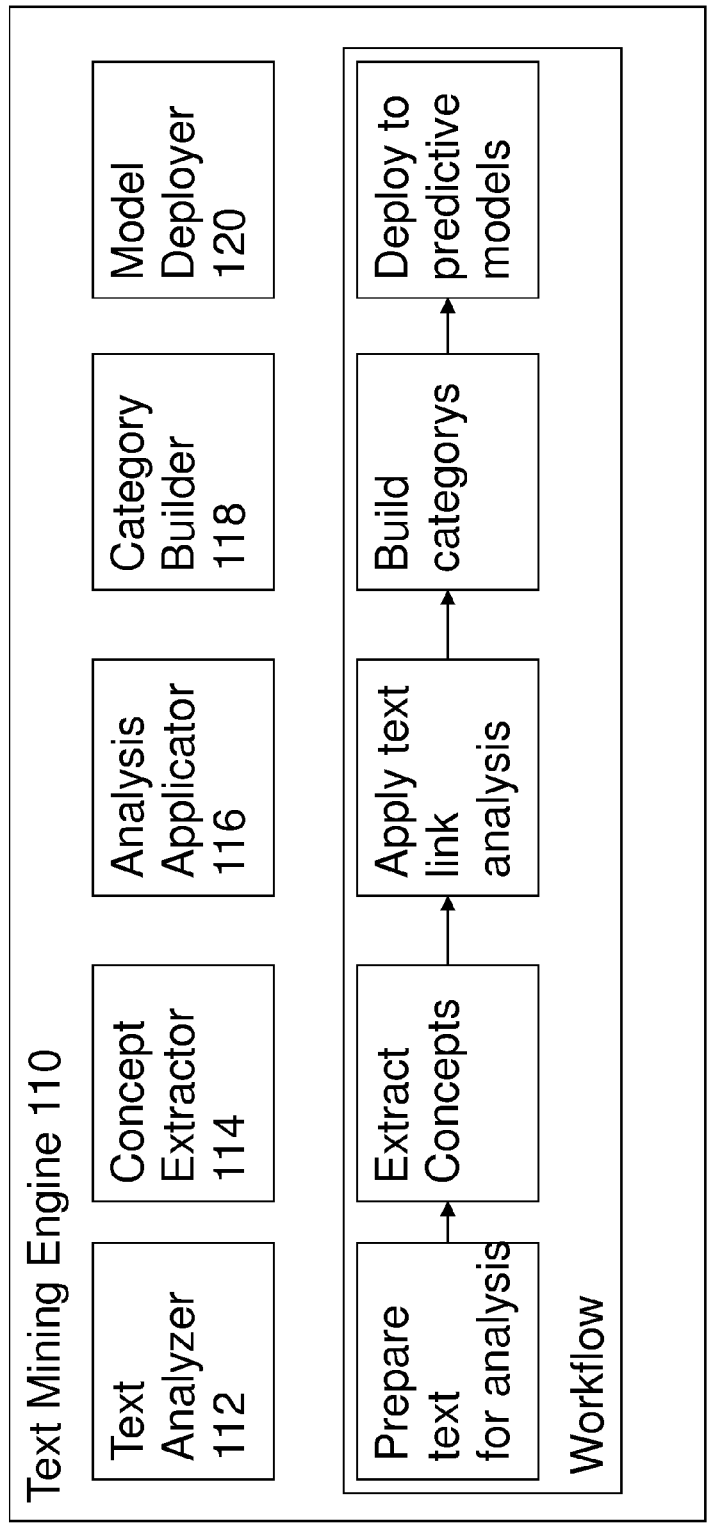
FIG. 11 is a component and workflow diagram of a text mining engine in accordance with a embodiment of the present invention.
Figure 12:
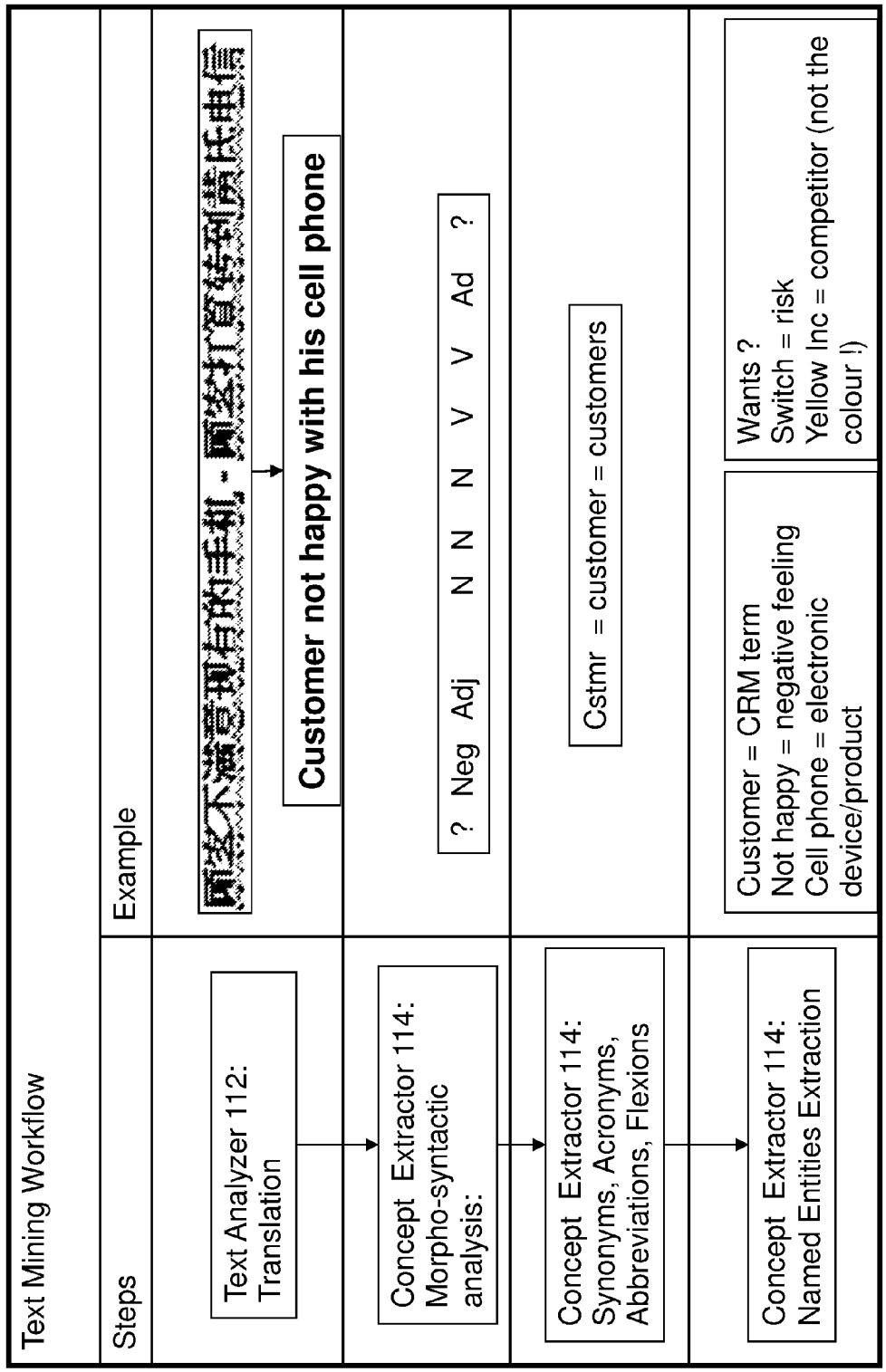
FIG. 12 is a flow diagram showing example mail and intermediate data during process by the text mining engine of FIG. 11 in accordance with a embodiment of the present invention.

Referring now to FIG. 11, a component and workflow diagram of text mining engine 110 in accordance with an embodiment is shown. Text mining engine 110 includes a text analyzer 112, a concept extractor 114, an analysis applicator 116, a category builder 118; and a model deployer 120. In exemplary embodiments, the text analyzer 112 is configured for preparing text for analysis. In the example shown in FIG. 12, a non-english text is translated into the English "Customer is not happy with his cell phone." The concept extractor 114 is configured for extracting key concepts from the prepared text and identifying sentiment from the concepts. The analysis applicator 116 is for applying text link analysis to the key concepts. The category builder 118 is configured for building categories from the text link analysis. The model deployer 120 is configured for deploying the resulting categories in a model. Examples of concept extraction and sentiment formation are shown in FIG. 12.

Morpho-syntatic analysis converts the English phrase "Customer not happy with his cell phone" into synatic symbols "? Neg Adj N N N V V Ad ?" used to identify meaning. "Customer" is labeled "?" as it is not identified. "Not' is identified as negative or "Neg". "Happy" is identified as an adjective or "Adj". Synonyms, acronyms, abbreviations and flexions are identified. In this example "Customer" is associated with "cstmr" and "customers".

Named entities are extracted. "Customer" is identified as a customer relationship management (CRM) term and a particular customer on the CRM database. The negative adjective is associated with the customer as a negative feeling. The particular device/product/service is extracted as the cell phone. Nothing is extracted for what the customer wants. A customer with a negative feeling is assumed to be a switch risk. A likely competitor for the device is identified as Yellow Inc.

Figure 13:
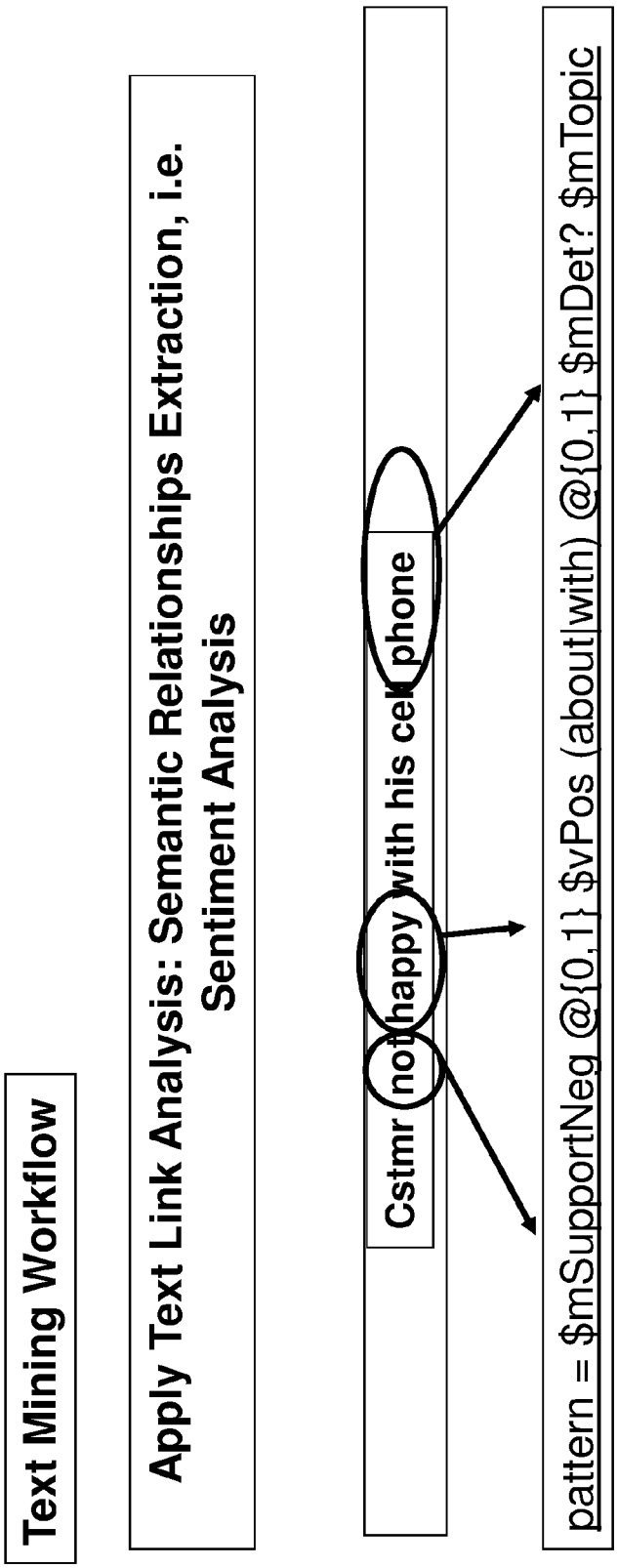
FIG. 13 shows example intermediate data after processing by the text mining engine of FIG. 11 in accordance with a embodiment of the present invention.

Referring now to FIG. 13, a text link analysis string in accordance with an embodiment is shown. Text link analysis aims to determine the attitude of a speaker with respect to the product or service by compiling the results from the concept extractor into a single text link analysis string.

Figure 14:
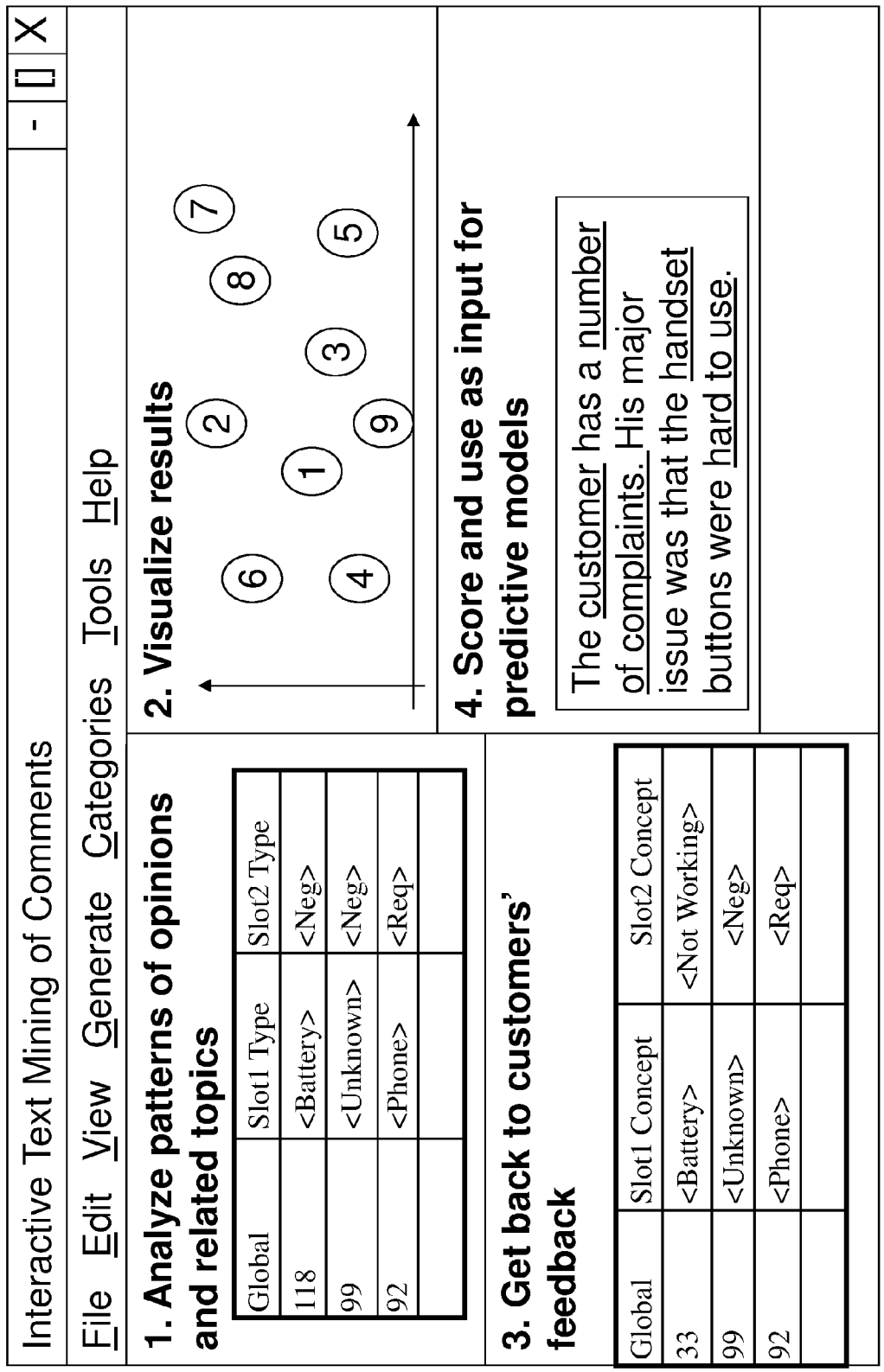
FIG. 14 is an example graphic user interface in accordance with an embodiment of the present invention.

Referring now to FIG. 14, a graphic user interface comprising four frames in accordance with an embodiment is shown. Frame 1 shows an analysis of opinion and related topics. Frame 2 shows a visualization of results. Frame 3 is a frame for allowing customer and user feedback. Frame 4 is a frame for the predictive model.

In exemplary embodiments the temporal attributes may be given higher weighting if relevant time and date occurs in or close to the out of office period. However, other embodiments can operate on mail received when the user is in the office when non-temporal attributes might take priority. In the other embodiments, temporal attributes can be given higher weightings if the relevant time and date occur in or close to periods when the user has not arrived at the office, is in meetings, or is at lunch.

It will be clear to one of ordinary skill in the art that all or part of the method of embodiments of the present invention may suitably and usefully be embodied in a logic apparatus, or a plurality of logic apparatus, comprising logic elements arranged to perform the blocks of the method and that such logic elements may comprise hardware components, firmware components or a combination thereof.

It will be equally clear to one of skill in the art that all or part of a logic arrangement according to embodiments of the present invention may suitably be embodied in logic apparatus comprising logic elements to perform the blocks of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, embodiments of the present invention may be realized in the form of a computer implemented method of deploying a service comprising blocks of deploying computer program code operable to, when deployed into a computer infrastructure and executed thereon, cause the computer system to perform all the blocks of the method.

In a further alternative, embodiments of the present invention may be realized in the form of a data carrier having functional data thereon, said functional data comprising functional computer data structures to, when loaded into a computer system and operated upon thereby, enable said computer system to perform all the blocks of the method.

It will be clear to one skilled in the art that many improvements and modifications can be made to the foregoing exemplary embodiment without departing from the scope of the present invention.

The invention claimed is:

1. A method for managing email in an email system, the method comprising:
   providing a plurality of topics, a reference associated with each of the plurality of topics, and a defined importance value for each of the references;
   preparing a topic relevance algorithm for each of the plurality of topics, each topic having associated attributes, and each topic relevance algorithm formed by estimating a relationship value between a topic and its associated attributes based on defined relevance of reference, characterized by;
   preparing an importance algorithm comprising weighted importance attributes formed by estimating a weight for each of the importance attributes based on defined importance of the reference;
   assessing a target mail using the topic relevance algorithms to determine a topic relevance and against the importance algorithm to determine an importance;
   determining that a target mail has a threshold importance for a particular topic relevance; and
   based on a determination that the target email exceeds threshold importance, calculating a criticity of the target email and raising an alert, wherein a type of the alert is based on the criticity, wherein the criticity is a function of the topic relevance and the importance,
   wherein the types of alerts include:
      sending a text message to an intended recipient of the target email if the criticity is below a first threshold;
      placing a call to the intended recipient of the target email if the criticity is above the first threshold and below a second threshold; and
      dispatching a person to contact the intended recipient of the target email if the criticity is above the second threshold.

2. A method according to claim 1, wherein statistical analysis is performed on the words of the mail to determine linguistic relative closeness to the topic, topic attributes and importance attributes.

3. A method according to claim 1, wherein target mail is collected from a first mail account associated with an-out of-office period and an alert is sent.

4. A method according to claim 1, wherein the importance and relevance of the target mail are provided in graphical form.

5. A method according to claim 1, wherein the associated attributes of the topic comprise: a temporal attribute; a spatial attribute; a personal attribute; and an informative attribute.

6. A method according to claim 1, further comprising providing a user interface for manual tuning of the relationship values of each topic relevance algorithm.

7. A method according to claim 1, wherein the importance algorithm attributes comprise: a delivery attribute; an originator attribute; and a criticality attribute.

8. A method according to claim 1, further comprising providing a user interface for an administrator to manually tune importance attribute weights in the importance algorithm.

9. A method according to claim 1, wherein a criticity value for a mail is determined as function of the relevance of a topic in a mail and the importance of that mail.

10. A computer program product for managing mail, the computer program product comprising a non-transitory computer readable storage medium having program code embodied therewith, the program code readable by a processor to perform a method comprising:
   providing a plurality of topics, a reference associated with each of the plurality of topics, and a defined importance value for each reference;
   preparing a topic relevance algorithm for each of the plurality of topics, each topic having associated attributes, and each topic relevance algorithm formed by estimating a relationship value between a topic and its associated attributes based on defined relevance of reference;
   preparing an importance algorithm comprising weighted importance attributes formed by estimating a weight for each of the importance attributes based on defined importance of the reference;
   assessing a target mail using the topic relevance algorithms to determine a topic relevance and against the importance algorithm to determine an importance;
   determining when a target mail has a threshold importance for a particular topic relevance; and
   based on a determination that the target email exceeds threshold importance, calculating a criticity of the target email and raising an alert, wherein a type of the alert is based on the criticity, wherein the criticity is a function of the topic relevance and the importance,
   wherein the types of alerts include:
      sending a text message to an intended recipient of the target email if the criticity is below a first threshold;
      placing a call to the intended recipient of the target email if the criticity is above the first threshold and below a second threshold; and
      dispatching a person to contact the intended recipient of the target email if the criticity is above the second threshold.

11. A computer program product according to claim 10, wherein statistical analysis is performed on the words of the mail to determine linguistic relative closeness to the topic, topic attributes and importance attributes.

12. A computer program product according to claim 10, wherein target mail is collected from a first mail account associated with an-out of-office period and an alert is sent.

13. A computer program product according to claim 10, wherein the importance and relevance of the target mail are provided in graphical form.

14. A computer program product according to claim 10, wherein the associated attributes of the topic comprise: a temporal attribute; a spatial attribute; a personal attribute; and an informative attribute.

15. A computer program product according to claim 10, further comprising providing a user interface for manual tuning of the relationship values of each topic relevance algorithm.

* * * * *